United States Patent
Hösel

(10) Patent No.: US 12,006,473 B2
(45) Date of Patent: Jun. 11, 2024

(54) METHOD FOR RECYCLING ASPHALT

(71) Applicant: HEMO GmbH, Ötisheim (DE)

(72) Inventor: Peter Hösel, Pforzheim (DE)

(73) Assignee: HEMO GmbH, Otisheim (DE)

( * ) Notice: Subject to any disclaimer, the term of this patent is extended or adjusted under 35 U.S.C. 154(b) by 251 days.

(21) Appl. No.: 17/627,871

(22) PCT Filed: Jul. 3, 2020

(86) PCT No.: PCT/EP2020/068863
§ 371 (c)(1),
(2) Date: Jan. 18, 2022

(87) PCT Pub. No.: WO2021/008906
PCT Pub. Date: Jan. 21, 2021

(65) Prior Publication Data
US 2022/0275281 A1    Sep. 1, 2022

(30) Foreign Application Priority Data

Jul. 17, 2019   (DE) .......................... 102019119423.7

(51) Int. Cl.
*C10C 3/02*         (2006.01)
*C08L 95/00*        (2006.01)

(52) U.S. Cl.
CPC .............. *C10C 3/026* (2013.01); *C08L 95/00* (2013.01); *C08L 2555/30* (2013.01); *C08L 2555/34* (2013.01)

(58) Field of Classification Search
CPC ...... C10C 3/026; C08L 95/00; C08L 2555/30; C08L 2555/34; B01D 11/0265; B01D 11/028; B01D 11/0288; B01D 11/0296
See application file for complete search history.

(56) References Cited

U.S. PATENT DOCUMENTS 4,273,644 A * 6/1981 Harris ...................... C10C 3/08
                                                              208/309
5,690,751 A * 11/1997 Hosel ................... C11D 7/5004
                                                               134/30

FOREIGN PATENT DOCUMENTS

DE          4329178       11/2006
JP          H07265603     10/1995

* cited by examiner

*Primary Examiner* — Randy Boyer
*Assistant Examiner* — Juan C Valencia
(74) *Attorney, Agent, or Firm* — Volpe Koenig

(57) ABSTRACT

A method and an apparatus for processing and recovering bitumen (42) and aggregate (41) from asphalt (40), in which: a) the asphalt (40) is mechanically comminuted; b) the comminuted asphalt is introduced into an evacuated or evacuatable processing chamber (1); c) the processing chamber (1) is evacuated by adjusting the pressure in the processing chamber (1) to a pressure lower than ambient pressure, preferably 200 mbar or lower; d) the processing chamber (1) is then charged at least once with a liquid organic solvent; e) the liquid organic solvent is then extracted from the processing chamber (1); and then f1) the organic solvent is fed into the evacuated processing chamber (1) in the vapor phase at the reduced pressure, at a temperature at or above the flash point of the organic solvent; and/or f2) liquid organic solvent is fed into the treatment chamber (1).

19 Claims, 1 Drawing Sheet

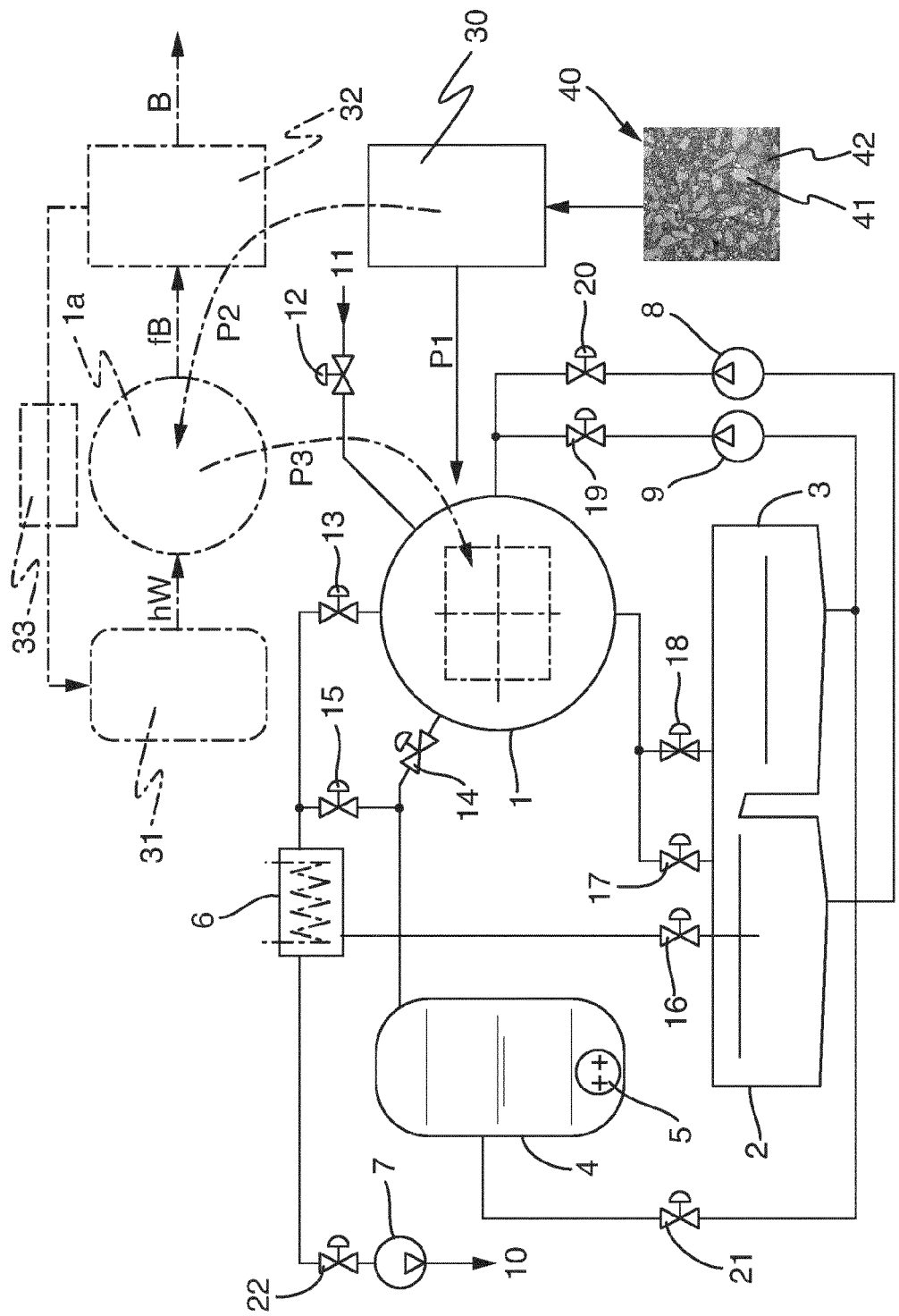

METHOD FOR RECYCLING ASPHALT

TECHNICAL FIELD

The invention relates to a method for treating and recovering bitumen and aggregates from asphalt.

The invention furthermore relates to an apparatus for carrying out the method according to the invention.

BACKGROUND

The following definitions of the terms "asphalt", "bitumen", "tar" and "aggregate" are taken from the online encyclopedia Wikipedia.

Asphalt is accordingly a natural or technically produced mixture of the binder bitumen and aggregates, which is used in road construction for roadway pavements, in building for floor surfaces, in hydraulic engineering and occasionally in disposal site construction for sealing. For technical and economic reasons, asphalt pavements are subdivided into different types of layers. In this case, distinction is made between asphalt base layers, asphalt binder layers and asphalt surface layers. They make their contribution to the load-bearing capacity of the overall design according to thickness and level, so long as all the layers are connected to form a compact structure. Asphalt chemically behaves almost inertly (slow reaction behavior) and has a thermoplastic behavior.

Bitumen (Latin pix tumens, "sweating pitch", "earth pitch", "grave pitch") according to DIN 55946, DIN EN 12597 is the term for the dark-colored, semisolid to resiliently hard, meltable, high molecular weight hydrocarbon mixtures obtained by the careful treatment of petroleums and the carbon disulfide-soluble components of natural asphalts as well as ozocerite, montan wax. It is to be distinguished from residues which are left by the pyrolysis of carbon-rich substances and are to be referred to not as bitumen but as tar. Tar differs significantly in production and chemical composition from bitumen. It is obtained not from petroleum but predominantly from lignite and anthracite, and contains a high proportion of polycyclic aromatic hydrocarbons (PAH). Since these are very hazardous to health, tar products can no longer be used as building materials in Germany. Mixtures of tar and bitumen have not been used in road construction since the 1980s. Also, only bitumen-containing, i.e. tar-free, mixtures may be referred to as "asphalt".

Natural and synthetic rock particles are referred to in construction engineering as aggregate. They either come from natural deposits or occur during the recycling of construction materials or as an industrial byproduct. The stones are either round particles or in crushed form.

The aggregate is worked together with a binder (for instance cement or lime) and added water to form concrete and mortar. If the aggregate is bound with bitumen, asphalt may be produced. In order to obtain the required properties of the construction material, the aggregates should have a corresponding composition.

Since only quartz sands with particular compositional and textural properties can be used in the construction industry for the production of mortar and concrete, sand is currently regarded as the second most important raw material by volume in the world after water. The great demand has already led to international conflicts. In Germany too, there is increasing resistance locally against the proliferation of sand extraction, from which inter alia there is a fear of uncontrolled destruction of the countryside and arable land.

The need for natural construction sand could be reduced by the preferred use of recycled construction waste (so-called recycled aggregates) and the fine-grained byproducts from the production of aggregates from natural stone (fine chippings, crushed sand and rock dust, combined under the term quarry dust) for concrete production.

For the repair of roads, the upper surface layers, which contain or are formed from bitumen and aggregates, are nowadays regularly milled down to a depth of for example 10 cm and disposed of in special disposal sites. In this way, valuable raw materials are then lost to the (construction) industry.

SUMMARY

The object of the invention is to recycle the waste materials occurring during the repair of roads with asphalt surfaces and therefore to make them reusable, so as in particular to counteract additional proliferation of petroleum and sand extraction and to save on high disposal costs.

This object is achieved according to the invention by a method having one or more of the features disclosed herein and by an apparatus having one or more of the features disclosed herein.

Advantageous refinements of the method according to the invention and the apparatus according to the invention are described below and in the claims.

According to the invention, a method for recovering bitumen and aggregates from asphalt involves the following steps a) to f1) and/or f2), according to which a) the asphalt is coarsely mechanically comminuted, preferably to a particle or clump size of ≤5 cm; b) the comminuted asphalt is introduced into an evacuated or evacuable processing chamber; c) the processing chamber is evacuated by adjusting the pressure in the processing chamber to a reduced pressure relative to the ambient pressure, preferably 200 mbar or less; d) the processing chamber is then charged at least once with a liquid organic solvent; e) the liquid organic solvent is subsequently extracted from the processing chamber; and then f1) the organic solvent is fed in the vapor phase into the evacuated processing chamber at the reduced pressure, preferably a pressure of 200 mbar or less, with a temperature at or above the flashpoint of the organic solvent, and the cleaning by condensation of the solvent vapor in respect of the asphalt residues (aggregates) is thus accomplished; and/or f2) liquid organic solvent is fed into the processing chamber, preferably at a reduced pressure, preferably a pressure of 200 mbar or less, most preferably with a temperature at or above the flashpoint of the organic solvent. The same solvent is preferably always used for all relevant steps, optionally after prior treatment. Different solvents may, however, also be used. If required, each of the steps may also be carried out repeatedly until the processing outcome becomes satisfactory. In step f2), the liquid solvent fed in may be fresh or treated (especially distilled) solvent.

The method described above according to steps c) to f1) is known in principle from DE 43 29 178 A1. It has, however, surprisingly been found that the method previously known only for the cleaning ("vapor degreasing") of industrially produced objects is also suitable for the recycling of asphalt, which was not readily predictable. The treated asphalt residues (sand and stones) may subsequently be reused in the (road) construction sector, which saves on resources and preserves the environment.

An apparatus according to the invention for carrying out the method comprises the processing chamber, an evaporator, a condenser and a vacuum pump as well as one or more storage containers for liquid solvent, which are connected by pipelines and valves in such a way that a reduced pressure relative to the ambient pressure, preferably a pressure of 200 mbar or less, can be maintained at least in the processing chamber and preferably in the entire plant while successive flushing of the processing chamber with liquid and/or evaporated solvent is carried out.

According to one advantageous refinement of the method according to the invention, the organic solvent is extracted from the processing chamber following step f1) or f2); and then the processing chamber is charged with cold or hot water, in particular hot water with a temperature of at least about 50° C. to 60° C., preferably at least about 80° C., most preferably about 100° C., and/or at a pressure elevated relative to the ambient pressure, in order to remove remaining solvent.

In one extremely advantageous refinement of the method according to the invention, before step c) the processing chamber is charged at least once with a liquid organic solvent below the flashpoint of the organic solvent, preferably at ambient or atmospheric pressure. The use of cold solvent at a temperature of ≥15° C. below the flashpoint and at ambient pressure is particularly preferred. As an alternative, before step c) the processing chamber may be evacuated, preferably to a pressure of 200 mbar or less, and is charged at least once with a liquid organic solvent above the flashpoint of the organic solvent. In this case, the temperature is preferably below the azeotropic temperature.

In this way, water contained in the (comminuted) asphalt (the "natural" residual moisture content may be about 3%) can be expelled either with the aid of the (cold) solvent or boiled by means of the hot solvent. As an alternative, purely thermal expulsion (boiling out or with hot air, optionally with subsequent (vacuum) drying) may otherwise be envisioned, although this is energetically less favorable. While cold solvent may be used under ambient pressure or in a vacuum, the use of vacuum is always advisable when using hot solvent.

As an alternative or in addition, before step c) or step d) the comminuted asphalt can be charged with cold or hot water, in particular hot water with a temperature of at least about 50° C. to 60° C., preferably at least about 80° C., most preferably about 100° C., and/or at an elevated pressure relative to the ambient pressure, preferably in the cleaning chamber. In this way, the bitumen may be dissolved out (liquefied) before the actual cleaning process and recovered separately. This may take place in the processing chamber itself or elsewhere (for example in a preprocessing chamber).

In order to accommodate the energy requirement, in all cases (especially in order to heat water and/or solvent and/or for the drying), heat from the thermal exploitation of bitumen obtained may be used, which will be discussed in more detail below. This also includes the distillation of "spent" solvent: the vapor thereby formed may be used for heating purposes inside the apparatus; the condensate may be sent back to the method as fresh solvent.

According to one advantageous refinement of the method according to the invention, in this context the recovered bitumen is used as fuel, in particular for heating the water added to obtain bitumen or the solvent in step f1) and/or f2).

In all cases in which the use of solvent is mentioned in the scope of the description, this may always be the same solvent—optionally after treatment—or the same type of solvent. Different solvents may, however, also be used for the individual steps. The term "solvent" also includes mixtures of at least two different solvents.

In all cases in which the use of vacuum or evacuation/pressure reduction is mentioned in the scope of the description, another form of "inerting" may also be used as an alternative, for example charging with a nitrogen or steam atmosphere. Different inertings may also be used for the individual steps. The term "inerting" means that external conditions which counteract ignition or even explosion of the solvent, or of an air/solvent mixture, are provided.

A first refinement of the apparatus according to the invention correspondingly comprises at least one supply line or a storage container for water, in particular hot water, in an active fluidic connection with the processing chamber and/or a preprocessing chamber for the comminuted asphalt.

In another advantageous refinement of the method according to the invention, liquefied bitumen is accordingly discharged and recovered before step c) or step d). This also contributes to sparing resources and reducing the burden on the environment.

A second refinement of the apparatus according to the invention to this end comprises a device for discharging floating liquid bitumen from the processing chamber and/or the preprocessing chamber.

It has already been mentioned that the recovered bitumen may advantageously be used as fuel, in particular for heating the water added to obtain bitumen or the solvent in steps f1) and/or f2).

A third refinement of the apparatus according to the invention to this end comprises a unit for thermal exploitation of the bitumen, in particular for heating the water added to obtain bitumen or the solvent in step f1) and/or f2), or generally for obtaining energy. Preferably, a combined heat and power unit for generating electricity is employed for this. By thermal exploitation of the bitumen, in particular polycyclic aromatic hydrocarbons (PAH) which are hazardous to health may be eliminated effectively.

Preferably, the recovered bitumen is not thermally exploited until after at least one prior distillation (for cleaning purposes), in order to separate and remove compounds which are potentially hazardous to health.

According to another refinement of the method according to the invention, the (hot) water optionally added to obtain bitumen is extracted before step c) or d), in order subsequently to be able to carry out the actual cleaning method unperturbed.

According to another refinement of the method according to the invention, the processing chamber is (again) charged with water following step f1) and/or f2). The cleaning action may be favorably influenced in this way.

According to yet another refinement of the method according to the invention—preferably before step b)—a size fraction with a particle size <1 mm (i.e. fine-grained sand) is separated, preferably by means of a screen, and processed separately according to the invention. This is because it has been found in practice that the aforementioned size fraction requires more elaborate processing than coarser clumps or chunks; optionally, the processing according to the invention—in particular according to steps c) to e)—for the sand is repeated several times. It may in principle be carried out in the same chamber as the processing of the coarser fraction.

In one refinement of the method according to the invention, which is based thereon, the separated and separately processed size fraction (the sand) is added to the residual asphalt again before step f1) or f2). The processing method may then be completed together for all size fractions.

According to one refinement of the method according to the invention, ultrasound may also be applied to an interior of the processing chamber, preferably during at least one of steps d), f1), f2) or the steps as claimed in claim 3. This ensures gentle movement of the material to be processed, without sand grains being rounded by grounding, which should be avoided in order to be able to use the recovered sand for building purposes.

The apparatus according to the invention may, in a corresponding refinement, have (in the processing chamber) at least one screen or screen basket, and/or (in an active connection with the processing chamber) a unit for coupling ultrasound into the processing chamber.

According to one likewise advantageous refinement of the method according to the invention, an absolute pressure of 125 mbar or less is maintained in the processing chamber during steps c) to f1) and/or f2). This has proven to be particularly effective.

According to a further advantageous refinement of the method according to the invention, the organic solvent contains more than 50 wt % of an aliphatic hydrocarbon having from 5 to 15 carbon atoms, an aromatic hydrocarbon, an organic compound containing oxygen, a cyclic siloxane or a mixture of two or more such compounds, expressed in terms of the total weight of the organic solvent. In this way, a particularly good cleaning action is achieved.

According to another refinement of the method according to the invention, the organic solvent is halogen-free. This is advantageous not least for reasons of environmental protection.

According to one particularly advantageous refinement of the method according to the invention, the organic solvent has a flashpoint of from 10° C. to 100° C.

According to another refinement of the method according to the invention, after the cleaning in the vapor phase, the asphalt residues, in particular the aggregates, are dried in a further step in which the absolute pressure in the processing chamber is reduced to one half or less of the pressure which is maintained during the cleaning in the vapor phase, in particular during steps c) to f).

Preferably, according to another refinement, the apparatus according to the invention also comprises a comminuting device for mechanical comminution of the asphalt, in order to achieve best possible cleaning, or recovery.

The following general description is derived from DE 43 29 178 A1, which originates from a predecessor in title of the present Applicant, and to which full reference is otherwise made. When an "object" or "objects" are mentioned below, in the scope of the present invention this means the constituents (residues) of the asphalt to be recycled, in particular its rock constituents (rock particles or aggregates, or stones and/or sand).

It has been found that one or more objects may be cleaned reliably in the vapor phase of an organic solvent according to the proposed method, even if the cleaning is carried out at a temperature at or above the flashpoint of the organic solvent. For the sake of simplicity, the following description relates to the cleaning of "objects", although the method according to the invention is not restricted to the cleaning of a plurality of objects but is equally suitable for the cleaning of a single object.

The flashpoint of an organic solvent is generally measured at atmospheric pressure. The definition used here for the flashpoint means the lowest temperature of a solvent at which the mixture of solvent vapor and air over the solvent can be ignited by the standard methods according to DIN 51755, DIN 51758 or DIN 53213. In the event of an explosion of the organic solvent, the resulting pressure is not more than about 8 times the original pressure in the processing chamber. By an absolute pressure of 200 mbar or less, preferably of 125 mbar or less, in particular of 100 mbar or less being maintained in the processing chamber, it is not necessary to carry out the cleaning in an expensive apparatus which withstands high pressures or contains expensive explosion-protected instruments. For economic reasons, the cleaning method according to the invention is carried out in such a way that the absolute pressure in the processing chamber is generally not less than 1 mbar, preferably not less than 10 mbar and in particular not less than 40 mbar. The pressure indicated means the pressure prevailing during the method of cleaning in the vapor phase.

In addition to the safety advantages described, it has been found that very clean objects may be obtained with the proposed method and the cleaned objects may efficiently be dried rapidly and thoroughly. It is important to process the objects at a temperature at or above the flashpoint of the organic solvent, in order to be able to achieve very efficient cleaning and subsequent drying of the objects. If the temperature is too low, the cleaning is less effective and the drying is incomplete, or the drying of the cleaned objects takes an undesirably long time. Within the pressure limits specified, the proposed method is preferably carried out at at least 10° C., particularly preferably at least 20° C. above the flashpoint of the organic solvent. Preferably, the method according to the invention is carried out at a temperature of up to 120° C., particularly preferably up to 100° C., in particular up to 80° C.

At least a part of the cleaning in the proposed method is carried out in the vapor phase of an organic solvent. The expression "an organic solvent" used here includes undiluted organic solvents and mixtures of two or more organic compounds which are generally referred to as organic solvents by the persons skilled in the art, as well as mixtures of one or more such organic compounds with water. If a solvent mixture is used, the mixture preferably contains more than 50%, particularly preferably more than 70%, in particular more than 95% of a halogen-free organic solvent, expressed in terms of the total weight of the mixture. Most advantageously, an entirely halogen-free organic solvent is used for the cleaning. If the solvent mixture used contains water, it preferably contains less than 80% water, particularly preferably less than 50% water, in particular less than 30% water, based on the total weight of the mixture. The proposed cleaning method is particularly suitable for an organic solvent which has a flashpoint that lies below its boiling point at atmospheric pressure and which has a boiling point of 100° C. or less at an absolute pressure of 1 mbar or more. Aliphatic hydrocarbons which contain from 5 to 15 carbon atoms, for example cyclic saturated hydrocarbons and straight-chained or branched, saturated or unsaturated hydrocarbons, preferably cycloalkanes, n-paraffins, isoparaffins or Stoddard solvent, or aromatic hydrocarbons, for example toluene or xylene, or oxygen-containing organic compounds, for example alcohols, preferably isopropanol, esters, preferably alkyl lactates or dibasic esters, for example commercially available mixtures of dibasic esters, ethers, preferably diethyl ether, ketones, preferably acetone or methyl ethyl ketone, or hydroxyethers, preferably alkoxypropanols or alkoxyethanols, cyclic siloxanes, which preferably contain from 6 to 8 ring atoms, or a mixture of two or more such compounds, are preferred. The solvents which are particularly preferably used in the method according to the invention have a flashpoint in the range of from 10° C. to 100° C., preferably from 40° C. to 100° C.

When objects are cleaned in a processing chamber in the vapor phase of an organic solvent, according to one configuration of the invention the entire process includes inter alia the following steps:

i) the objects to be processed are brought into the processing chamber and the processing chamber is closed;

ii) the pressure in the processing chamber is optionally adjusted to atmospheric pressure or less, preferably to 200 mbar or less, in particular to 125 mbar or less, particularly preferably to 100 mbar or less, and the objects are precleaned with liquid solvent;

iii) the pressure in the processing chamber is adjusted to 200 mbar or less, in particular to 125 mbar or less, particularly preferably to 100 mbar or less;

iv) solvent vapor is fed into the evacuated processing chamber, an absolute pressure of 200 mbar not being exceeded in the processing chamber, and the objects are cleaned by condensation of the solvent vapor onto the objects;

v) the cleaned objects are dried and the concentration of the solvent vapor is reduced in the processing chamber; and vi) the pressure in the processing chamber is increased and the processing chamber is unloaded.

Step i) may be carried out in a known manner. The objects may, for example, be placed in containers such as baskets, etc.

Step ii) is optionally carried out. It may likewise be carried out in a known manner. Known vacuum pumps may be used in order to achieve the desired pressure reduction. Such vacuum pumps are not described in detail here. The processing chamber is preferably flooded with a liquid solvent in order to preprocess the objects. Preferably, the processing chamber is flooded by pumping liquid solvent from a storage container into the processing chamber. When the objects have been cleaned, the solvent is preferably returned from the processing chamber into the storage tank. If desired, these steps, i.e. flooding the processing chamber with liquid solvent, cleaning the objects and draining the liquid solvent from the processing chamber, may be repeated once or several times. In this case, fresh solvent is preferably fed into the processing chamber from another storage container. Pumps for filling and draining the processing chamber are known. If a pressure which is higher than 125 mbar is reached in step ii), the temperature of the liquid solvent is preferably adjusted in such a way that it is at least 15° C. lower than the flashpoint of the solvent. The temperature of the solvent which is fed into the processing chamber is generally at least 10° C. lower, preferably at least 20° C. lower than the temperature of the solvent vapor which is fed into the processing chamber in step d). As mentioned above, the preprocessing with liquid solvent is not a mandatory method feature. If the objects are precleaned with liquid solvent, it is generally advisable to regulate the pressure in the processing chamber in two steps, i.e. before and after the preprocessing. If preprocessing is not carried out, the processing chamber may generally be evacuated in a single step before solvent vapor is fed into the processing chamber.

In step iii), evacuation may be carried out in a known way. Before solvent vapor is fed into the processing chamber, the desired absolute final pressure therein is equal to or less than the absolute pressure of the vapor which is fed into the processing chamber in step iv).

In the vapor-phase cleaning step iv), solvent vapor is fed into the processing chamber, in which an absolute pressure of 200 mbar, preferably of 125 mbar, in particular of 100 mbar is not exceeded. The solvent vapor is preferably generated in an evaporator and fed into the processing chamber. The absolute pressure in the evaporator is equal to or higher than the pressure which prevails in the processing chamber before solvent vapor is fed in. The absolute pressure in the evaporator is not, however, higher than 200 mbar, preferably not higher than 125 mbar, in particular not higher than 100 mbar. The solvent vapor preferably has a temperature which is equal to or higher than the flashpoint of the organic solvent used. The objects to be processed generally have an initial temperature which is lower than the temperature of the solvent vapor. They preferably have a temperature between room temperature and 10° C. below the temperature of the solvent vapor, in particular between room temperature and 20° C. below the temperature of the solvent vapor. The effect of this lower temperature is that at least a part of the solvent vapor condenses on the surface of the objects. The temperature of the objects normally rises during the cleaning in the vapor phase, according to the heat transfer between the vapor and the objects. When the cleaning step d) in the vapor phase is completed, at least the surface of the objects generally has approximately the same temperature as the solvent vapor. Excess solvent vapor may be removed from the processing chamber and, for example, condensed in a known manner in a condenser. The condensed solvent may be recovered and processed further. The condensed solvent may, for example, be brought for reuse into the evaporator or into one or more storage containers.

After the step iv) of cleaning in the vapor phase, the cleaned objects are generally dried, step v). It is advantageous to reduce the pressure in the processing chamber. During the drying step, the pressure is preferably one half, particularly preferably one fifth, and in particular one tenth of the pressure which is maintained during the cleaning step iv). The pressure reduction facilitates rapid evaporation of excess solvent which adheres on the surface of the cleaned objects. It has been found that the drying is even more efficient when the pressure is reduced very rapidly, for example when a connection, for example a valve, between the processing chamber and an evacuated container is opened. The low vapor pressure of the solvent also prevents excessively high solvent emissions when the processing chamber is unloaded. The solvent vapors removed may, for example, be condensed and/or adsorbed in a known way in a condenser. The condensed and/or adsorbed solvent may be recovered and processed further. The condensed solvent vapor may, for example, be brought for reuse into the evaporator or into one or more storage containers.

In respect of the apparatus used, the processing chamber and the evaporator should be evacuable, i.e. they should be designed in such a way that they can be evacuated. The evaporator is used to heat the organic solvent and generate solvent vapor under reduced pressure. The processing chamber and the evaporator may be evacuated with the aid of the vacuum pump. The apparatus according to the invention also contains a condenser. The condenser has the one function of condensing excess solvent which is removed from the processing chamber in the above-described step iv) of cleaning in the vapor phase and/or in the drying step v). If necessary, the condenser may also be used together with the evaporator to distil the organic solvent.

The apparatus according to the invention additionally contains one or more storage containers for the liquid solvent. The storage container or containers should be evacuable, i.e. they should be designed in such a way that they can be evacuated. The storage container or containers may be connected to the processing chamber in a known manner.

The condenser is preferably likewise connected to the storage container(s). In the storage container, the objects may be precleaned with liquid solvent, and condensed solvent from the condenser and/or from the processing chamber may be collected. The apparatus according to the invention also contains a line system, which is equipped with valves that are not described in detail here.

BRIEF DESCRIPTION OF THE DRAWINGS

Further properties and advantages of the invention may be found from the following description of exemplary embodiments with the aid of the drawing.

FIG. 1 shows a schematic representation of a preferred embodiment of the apparatus according to the invention.

DETAILED DESCRIPTION

The apparatus contains a processing chamber 1, optionally (denoted by dots and dashes) a preprocessing chamber 1a, two storage containers 2 and 3, an evaporator 4, a heating device 5 and a condenser 6. They are connected by means of a line system, which is provided with a vacuum pump 7, two pumps 8 and 9, and valves 12, 13, 14, 15, 16, 17, 18, 19, 20, 21 and 22. Feed air 11 can be fed into the processing chamber 1. Off-gas 10 can be removed from the apparatus with the aid of the vacuum pump 7.

Furthermore optionally present, and correspondingly indicated by dots and dashes, are a storage container 31 for water, in particular hot water hW, in an active fluidic connection with the processing chamber 1 and/or the preprocessing chamber 1a, depending on the configuration of the apparatus. The latter may furthermore comprise a device 32 for discharging floating liquid bitumen fB, which may be dissolved from the asphalt by the action of the hot water hW, from the processing chamber 1 and/or the preprocessing chamber 1a. A comminuting device for mechanical comminution of the asphalt 40, before it is introduced into the processing chamber 1 and/or (beforehand) into the preprocessing chamber 1a, is represented by reference 30. The asphalt 40 contains rock particles at reference 41 and bitumen at reference 42. The bitumen 42 may advantageously be for the most part recovered already in the preprocessing chamber 1a by the use of hot water hW, before the final cleaning of the rock particles (stones and sand) 41 takes place in the processing chamber 1.

The apparatus furthermore optionally comprises a thermal exploitation/combustion unit 33 for the bitumen fB discharged from the processing chamber 1 and/or the preprocessing chamber 1a, in particular but not exclusively for heating the water hW in the storage container 31. Very generally, the bitumen occurring may be used to obtain energy inside or outside the plant. Exploitation in a combined heat and power unit or the like, in particular for generating electricity, is also envisioned.

Arrow P1 shows the direct introduction of the (comminuted) asphalt 40 into the processing chamber 1; as an alternative, arrows P2 and P3 show the described "detour" through the preprocessing chamber 1a. Arrow B indicates that bitumen recovered at 32 may be discharged and used further in another way.

In other regards, the apparatus functions as already described in DE 43 29 178 A1. When "objects" are mentioned below, this again means the asphalt constituents defined above.

Before the cleaning apparatus is ready for use, the evaporator 4 is filled with liquid solvent. All the valves are closed. The valves 13, 15, 17 and 22 are then opened in order to evacuate the entire apparatus with the aid of the vacuum pump 7. When the desired pressure is reached, the distillation of the liquid solvent in the evaporator 4 is started. The valves 13 and 17 are closed and the valves 15 and 16 are opened. The heating device 5 is turned on in order to evaporate the solvent. The solvent vapor is brought into the condenser 6. The condensed solvent flows into the storage container 2. The overflow of the storage container 2 flows into the storage container 3. If necessary, liquid solvent is fed from the storage container 3 into the evaporator; to this end, the valve 21 is alternately opened and closed as required. During the distillation, the pressure in the cleaning apparatus may be controlled with the aid of the vacuum pump 7 and the valve 22, which is alternately opened and closed.

The cleaning apparatus is then ready for use. The valve 12 is opened and feed air 11 is fed into the processing chamber 1 until the processing chamber is at atmospheric pressure. In a first step i), the processing chamber is opened, loaded with the objects to be processed and closed again. In a second step ii), valve 12 is closed and the valves 13 and 22 are opened in order to evacuate the processing chamber with the aid of the vacuum pump 7 as far as the desired pressure. In the preprocessing step iii), the valve 19 is opened and liquid solvent is pumped from the storage container 3 into the processing chamber 1 with the aid of the pump 9. The cleaning action may be increased by mechanically moving the objects and/or (preferably, in order to avoid sand grains being rounded by grounding) generating ultrasound waves in the processing chamber. The valve 19 is closed. When this washing process is completed, the valve 18 is opened and the contaminated liquid solvent is brought into the storage container 3. The contaminated liquid solvent may then be brought into the evaporator 4, which is still in operation. The valve 18 is closed. The valve 20 is opened and liquid solvent is pumped from the storage container 2 into the processing chamber 1 with the aid of the pump 8, in order to carry out second preprocessing with liquid solvent. The valve 20 is closed. When the second washing process is completed, the valve 17 is opened and the contaminated liquid solvent is brought into the storage container 2, from where it overflows into the storage container 3. During and after the preprocessing step c), the pressure in the processing chamber 1 may be controlled with the aid of the vacuum pump 7, the valve 22 alternately being opened and closed. During the above-described steps i)-iii), the liquid solvent is constantly distilled in the evaporator 4.

The valves 15 and 17 are closed and the valve 14 is opened, so that the step d) of cleaning in the vapor phase can be started. The distillation of the liquid solvent is to this end suspended. Solvent vapor is fed via the opened valve 14 into the processing chamber, where it condenses on the objects until their surface has the same temperature as the solvent vapor. The valve 14 is then closed and the valves 15 and 17 are opened. The condensed solvent flows into the storage container 2.

Before the drying step v), the valves 15, 16 and 17 are closed. The pressure in the processing chamber 1 is reduced further with the aid of the vacuum pump 7, the valve 22 alternately being opened and closed. The cleaned objects are thereby dried. After the drying step v), the pressure in the processing chamber is equalized to the pressure in the other parts of the cleaning apparatus by closing the valve 22 and feeding a controlled amount of fresh air into the processing chamber via the valve 12. The valves 15 and 16 are opened so that the distillation of the liquid solvent can be continued.

The valve 22 is alternately opened and closed as many times as necessary in order to maintain the desired pressure in the cleaning apparatus.

In step vi), the valve 13 is closed and the valve 12 is opened again.

The pressure in the processing chamber is thereby increased to atmospheric pressure. The processing chamber is opened in order to unload it. A new cleaning cycle may then be started at step i) above.

A screen or the like (not shown) may be provided in the processing chamber in order to separate different size fractions of the material to be processed.

The invention claimed is:

1. A method for processing and recovering bitumen (42) and aggregates (41) from asphalt (40), the method comprising:
   a) mechanically comminuting the asphalt (40);
   b) introducing the comminuted asphalt into an evacuated or evacuable processing chamber (1);
   c) evacuating the processing chamber (1) by adjusting a pressure in the processing chamber (1) to a reduced pressure relative to ambient pressure;
   d) then charging the processing chamber (1) at least once with a liquid organic solvent;
   e) subsequently extracting the liquid organic solvent from the processing chamber (1); and then at least one of
   f1) feeding the organic solvent in a vapor phase into the evacuated processing chamber (1) at the reduced pressure, with a temperature at or above a flashpoint of the organic solvent; or
   f2) feeding the liquid organic solvent into the processing chamber (1).

2. The method as claimed in claim 1, further comprising extracting the organic solvent from the processing chamber (1) following at least one of step f1) or f2); and then charging the processing chamber (1) with cold or hot water.

3. The method as claimed in claim 2, further comprising before step c), charging the processing chamber (1) at least once with a liquid organic solvent below the flashpoint of the organic solvent; or
   before step c), evacuating the processing chamber (1) and charging the processing chamber (1) at least once with a liquid organic solvent above the flashpoint of the organic solvent.

4. The method as claimed in claim 2, further comprising discharging and recovering liquefied bitumen at least one of before step e) or step f1) or step f2).

5. The method as claimed in claim 4, further comprising using the recovered bitumen as fuel for heating water to provide the hot water.

6. The method as claimed in claim 1, further comprising before step b), separating a size fraction with a particle size <1 mm, and processing the separated size fraction separately.

7. The method as claimed in claim 6, further comprising adding the separated and separately processed size fraction to residual asphalt again before at least one of step f1) or f2).

8. The method as claimed in claim 1, further comprising applying ultrasound to an interior of the processing chamber (1) during at least one of steps d), f1), f2).

9. The method as claimed in claim 1, further comprising maintaining an absolute pressure of 125 mbar or less in the processing chamber (1) during steps c) to f1) and/or f2).

10. The method as claimed in claim 1, wherein the organic solvent contains more than 50 wt % of one or more of an aliphatic hydrocarbon having from 5 to 15 carbon atoms, an aromatic hydrocarbon, an organic compound containing oxygen, or a cyclic siloxane, expressed in terms of a total weight of the organic solvent.

11. The method as claimed in claim 1, wherein the organic solvent is halogen-free.

12. The method as claimed in claim 1, wherein the organic solvent has a flashpoint of from 10° C. to 100° C.

13. The method as claimed in claim 1, further comprising after the cleaning in the vapor phase, drying asphalt residues including the aggregates in a further step in which an absolute pressure in the processing chamber is reduced to one half or less of the pressure which is maintained during cleaning in the vapor phase during steps c) to f1) and/or f2).

14. An apparatus for processing and recovering bitumen (42) and aggregates (41) from asphalt (40), the apparatus comprising:
   a processing chamber (1, 1a) configured to receive a comminuted asphalt, the processing chamber having a reduced pressure relative to ambient pressure, wherein the processing chamber is charged at least once with a liquid organic solvent, and wherein the processing chamber is subsequently extracted of the liquid organic solvent before at least one of f1) feeding the organic solvent in a vapor phase into the processing chamber (1) at the reduced pressure, with a temperature at or above a flashpoint of the organic solvent, or f2) feeding the liquid organic solvent into the processing chamber (1);
   an evaporator (4), a condenser (6), a vacuum pump (7), and one or more storage containers (2, 3) for the liquid organic solvent, which are connected by pipelines and valves and configured such that a reduced pressure relative to the ambient pressure is maintainable at least in the processing chamber (1) while successive flushing of the processing chamber (1) with at least one of the liquid and/or an evaporated organic solvent is carried out; and
   at least one supply line or a storage container (31) for water in an active fluidic connection with at least one of the processing chamber (1) or a preprocessing chamber (1a) for the comminuted asphalt.

15. The apparatus as claimed in claim 14, further comprising a device (32) for discharging floating liquid bitumen (fB) from at least one of the processing chamber (1) or the preprocessing chamber (1a).

16. The apparatus as claimed in claim 15, further comprising a unit (33) for thermal exploitation of the bitumen (fB) discharged from at least one of the processing chamber (1) or the preprocessing chamber (1a).

17. An apparatus for processing and recovering bitumen (42) and aggregates (41) from asphalt (40), the apparatus comprising:
   a processing chamber (1, 1a) configured to receive a comminuted asphalt, the processing chamber having a reduced pressure relative to ambient pressure, wherein the processing chamber is charged at least once with a liquid organic solvent, and wherein the processing chamber is subsequently extracted of the liquid organic solvent before at least one of f1) feeding the organic solvent in a vapor phase into the processing chamber (1) at the reduced pressure, with a temperature at or above a flashpoint of the organic solvent, or f2) feeding the liquid organic solvent into the processing chamber (1);
   an evaporator (4), a condenser (6), a vacuum pump (7), and one or more storage containers (2, 3) for the liquid organic solvent, which are connected by pipelines and valves and configured such that a reduced pressure relative to the ambient pressure is maintainable at least in the processing chamber (1) while successive flushing of the processing chamber (1) with at least one of the liquid and/or an evaporated organic solvent is carried out; and a comminuting device (30) configured for mechanical comminution of the asphalt (40).

18. The method of claim 1, wherein the reduced pressure is 200 mbar or less.

19. The method of claim 1, wherein in step f2), the liquid organic solvent is fed at a reduced pressure, and with a temperature at or above the flashpoint of the organic solvent.

* * * * *